(12) United States Patent
Macchia et al.

(10) Patent No.: US 11,098,646 B2
(45) Date of Patent: Aug. 24, 2021

(54) GAS TURBINE IMPELLER NOSE CONE

(71) Applicant: PRATT & WHITNEY CANADA CORP., Longueuil (CA)

(72) Inventors: Enzo Macchia, Kleinburg (CA); Daniel Alecu, Brampton (CA); Sean Downard, Brampton (CA); David Hill, Ancaster (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 146 days.

(21) Appl. No.: 16/504,803

(22) Filed: Jul. 8, 2019

(65) Prior Publication Data
US 2021/0010421 A1    Jan. 14, 2021

(51) Int. Cl.
*F02C 7/047* (2006.01)

(52) U.S. Cl.
CPC .......... *F02C 7/047* (2013.01); *F05D 2220/32* (2013.01)

(58) Field of Classification Search
CPC ............................. F02C 7/047; F05D 2220/32
See application file for complete search history.

(56) References Cited

U.S. PATENT DOCUMENTS

| | | | | |
|---|---|---|---|---|
| 4,941,317 A * | 7/1990 | Ivey | ........................ | F01D 5/085 416/95 |
| 5,833,435 A * | 11/1998 | Smith | ........................ | F02C 7/04 416/94 |
| 9,062,566 B2 | 6/2015 | Suciu et al. | | |
| 9,920,708 B2 | 3/2018 | Suciu et al. | | |
| 2011/0158808 A1 * | 6/2011 | Henze | ........................ | B64C 11/14 416/94 |
| 2013/0259638 A1 * | 10/2013 | Suciu | ........................ | F01D 9/02 415/1 |
| 2018/0030893 A1 | 2/2018 | Duong | | |
| 2018/0347463 A1 * | 12/2018 | Ward | ........................ | B64D 15/04 |

FOREIGN PATENT DOCUMENTS

GB      2038425      7/1980

* cited by examiner

*Primary Examiner* — Jacob M Amick
*Assistant Examiner* — Charles J Brauch
(74) *Attorney, Agent, or Firm* — Norton Rose Fulbright Canada LLP

(57) ABSTRACT

A gas turbine engine is provided, with a compressor section including a fan driven by an engine shaft about a rotation axis, the engine shaft defining a bore extending axially therethrough from a hot gas inlet to a hot gas outlet, the hot gas inlet located downstream of the compressor section, a nose cone mounted to the fan and defining a cavity therewithin, a first impeller and a second impeller mounted within the cavity, the first impeller having an inlet facing a forward direction of the gas turbine engine, the inlet of the first impeller in fluid flow communication with an air inlet defined in an outer surface of the nose cone, the second impeller having an inlet facing a rearward direction of the gas turbine engine, the inlet of the second impeller being in fluid flow communication with the hot gas outlet of the engine shaft.

19 Claims, 5 Drawing Sheets

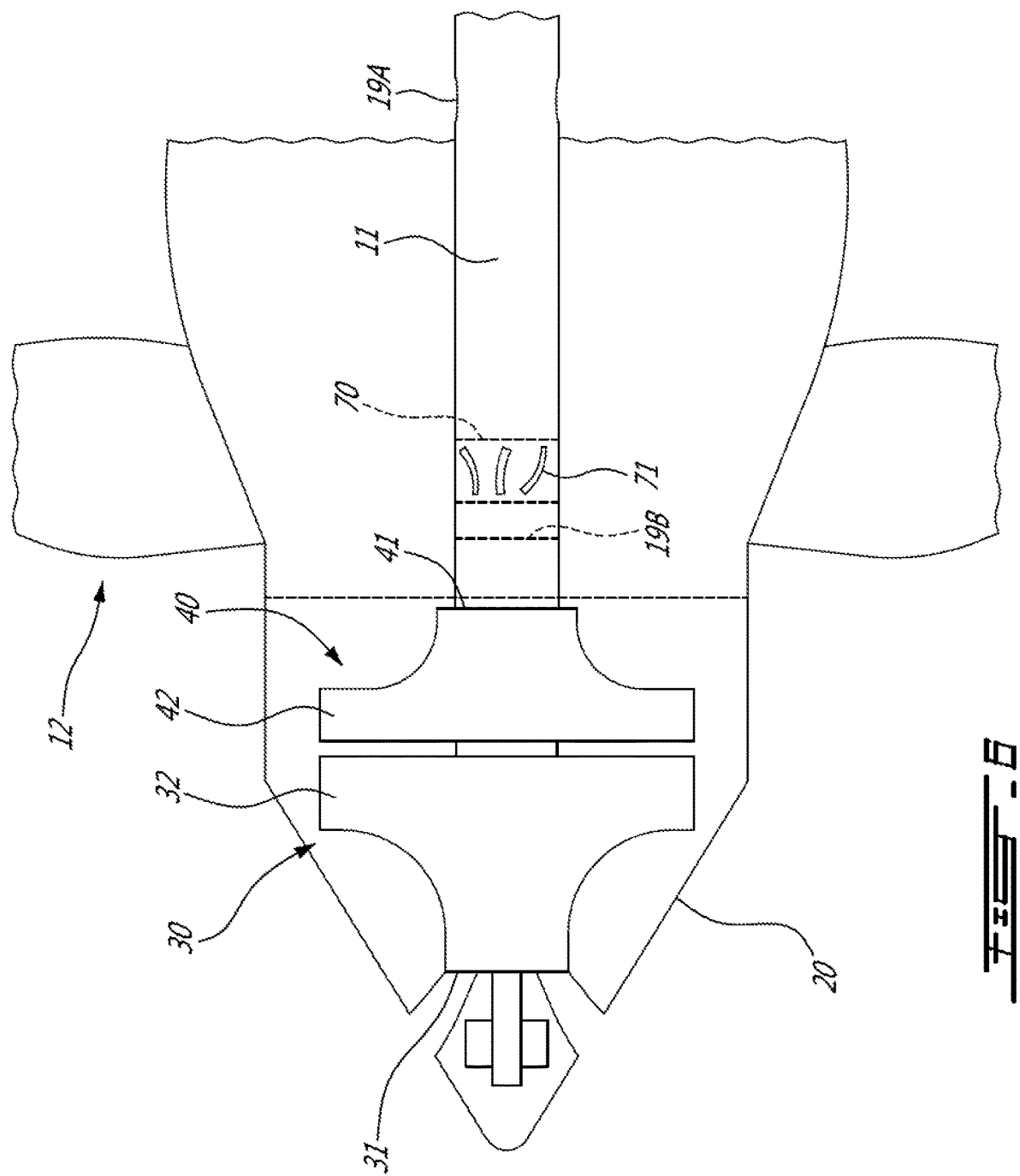

GAS TURBINE IMPELLER NOSE CONE

TECHNICAL FIELD

The application relates generally to systems for anti-icing turbofan engines and, more particularly, for de-icing fan blades.

BACKGROUND

Ice build-up on the fan blades of a turbofan gas turbine engine can occur under various operating conditions, including cold operating temperatures and/or when air flow containing moisture or precipitation encounters the fan under appropriate conditions. Ice can form when the air pressure, humidity, and/or air flow temperature to which the fan blades are exposed are within specific ranges. Ice formation on the fan blades is undesirable, as it can accumulate in layers and then become dislodged by air flow and motion, causing hard ice particles to be ingested into the engine.

SUMMARY

In one aspect, there is provided a gas turbine engine, comprising: a compressor section including a fan having a plurality of fan blades, the fan driven by an engine shaft about a rotation axis, the engine shaft defining a bore extending axially therethrough from a hot gas inlet to a hot gas outlet, the hot gas inlet located downstream of the compressor section relative to a direction of airflow through the engine in use; a nose cone mounted to the fan and extending upstream of the fan blades, the nose cone defining a cavity therewithin; a first impeller mounted within the cavity of the nose cone, the first impeller having an inlet facing a forward direction of the gas turbine engine, the inlet of the first impeller in fluid flow communication with an air inlet defined in an outer surface of the nose cone to receive ambient air; and a second impeller mounted within the cavity of the nose cone, the second impeller having an inlet facing a rearward direction of the gas turbine engine, the inlet of the second impeller being in fluid flow communication with the hot gas outlet of the engine shaft.

In another aspect, there is provided a nose cone for a gas turbine engine, the nose cone having a conical body defining a tip of the nose cone, the nose cone comprising: an air inlet defined in the conical body to receive ambient air; a forward facing impeller mounted within the nose cone, the forward facing impeller having an inlet and an outlet in fluid flow communication, the inlet closer from the tip than the outlet, the inlet in fluid flow communication with the air inlet and the outlet in fluid flow communication with an air outlet defined in the conical body further from the tip of the nose cone than the air inlet; and a rearward facing impeller mounted within the nose cone, the rearward facing impeller coaxial with the forward facing impeller, the rearward facing impeller having an inlet facing opposite the tip of the nose cone.

In a further aspect, there is provided a method of de-icing fan blades of a gas turbine engine, the gas turbine engine including a nose cone and an engine shaft, the method comprising: receiving ambient air from upstream of the gas turbine engine into a forward facing impeller disposed in the nose cone via an air inlet defined in the nose cone and in fluid flow communication with the forward facing impeller; receiving hot gas from a compressor section of the gas turbine engine into a rearward facing impeller disposed in the nose cone via a gas passage inside of the engine shaft in fluid flow communication with the rearward facing impeller; expanding the hot gas via the rearward facing impeller and compressing the ambient air via the forward facing impeller; and discharging at least part of the ambient air exiting from the forward facing impeller and the hot gas exiting from the rearward facing impeller upstream of the fan blades.

BRIEF DESCRIPTION OF THE DRAWINGS

Reference is now made to the accompanying figures in which:

FIG. 6 is a partial cross-section view of a schematic representation of the nose cone with impellers of FIG. 2, and a pre-swirler.

DETAILED DESCRIPTION

The present disclosure relates to assemblies and methods for de-icing inner roots of fan blades by injecting air into the flow passage defined by the inlet fan. In some embodiments, the disclosed assemblies and methods may serve to provide (e.g., flow control) injection air to a root or other region(s) of one or more fan blades to influence the flow characteristics around the fan blades. In some situations, such influence on the flow characteristics may result in repelling radially outwardly, away from the engine core, particles, which may include ice particles, sand, dirt, etc., such as to limit or minimize injection of such particles into the engine core. In some embodiments, the disclosed systems and methods may be adapted to drive injection air for discharge into the flow passage defined by the inlet fan from within a nose cone of the gas turbine engine. In some embodiments, the disclosed systems and methods may be adapted to supercharge a root region of the blades of the fan (i.e., fan inner core) by discharging injection air into the flow passage (e.g., upstream of the fan blades) via a turbocompressor system within the nose cone.

Aspects of various embodiments are described through reference to the drawings.

Figure 1:
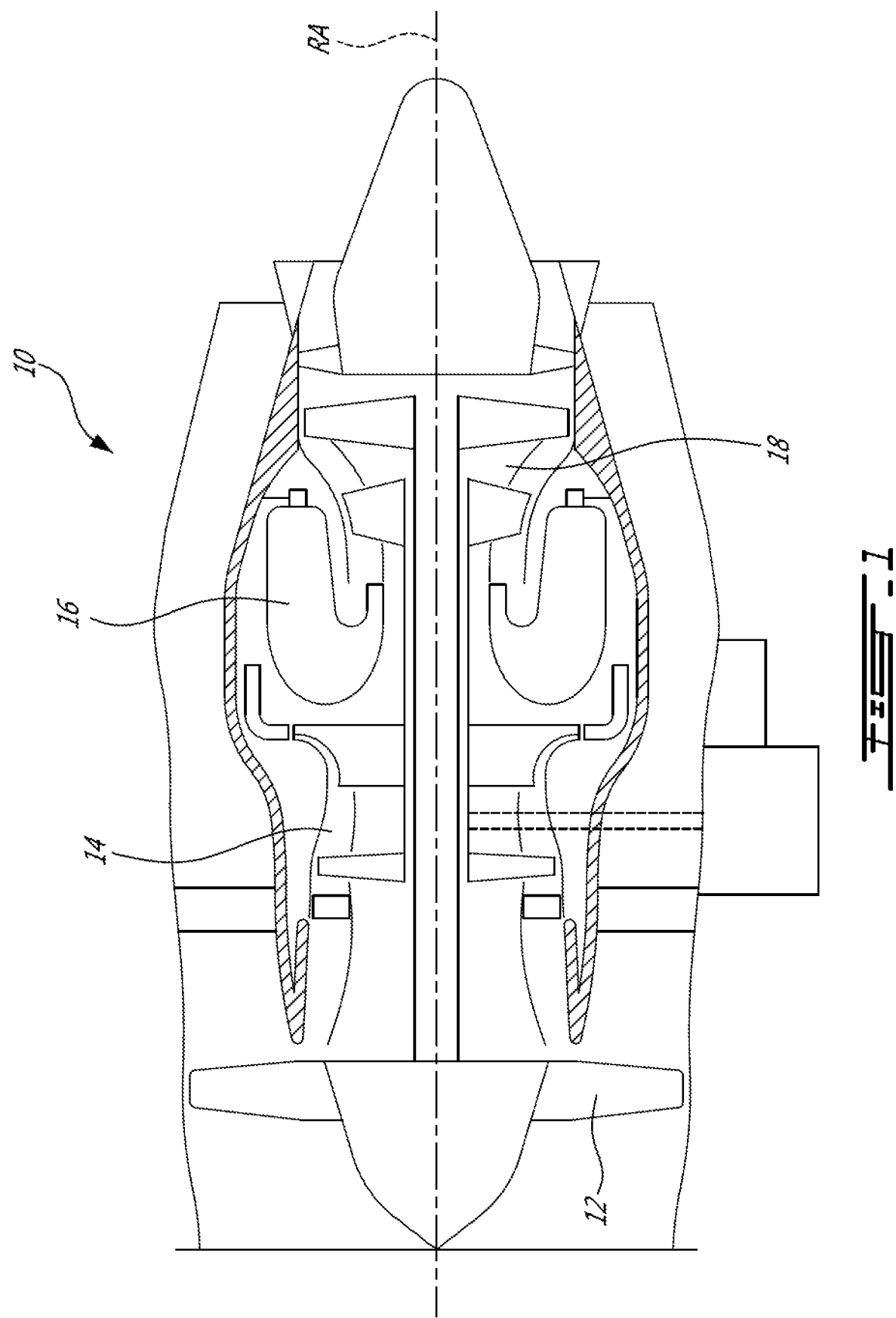
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a multistage compressor section 14 for pressurizing the air, a combustor 16 in which the compressed air is mixed with fuel and ignited for generating an annular stream of hot combustion gases, and a turbine section 18 comprising one or more turbines for extracting energy from the combustion gases. The gas turbine engine 10 may be suitable for use in aircraft applications. For example, the gas turbine engine 10 may be of the turbofan type. It is understood that aspects of the present disclosure may also be applicable to other types of gas turbine engines, such as turboprop engines. The gas turbine engine 10 comprises a central axis of rotation RA about which one or more spools of the gas turbine engine 10 may rotate. In some embodiments, central axis of rotation RA may also correspond to (i.e., be coaxial with) a rotation axis of the fan 12.

Figure 2:
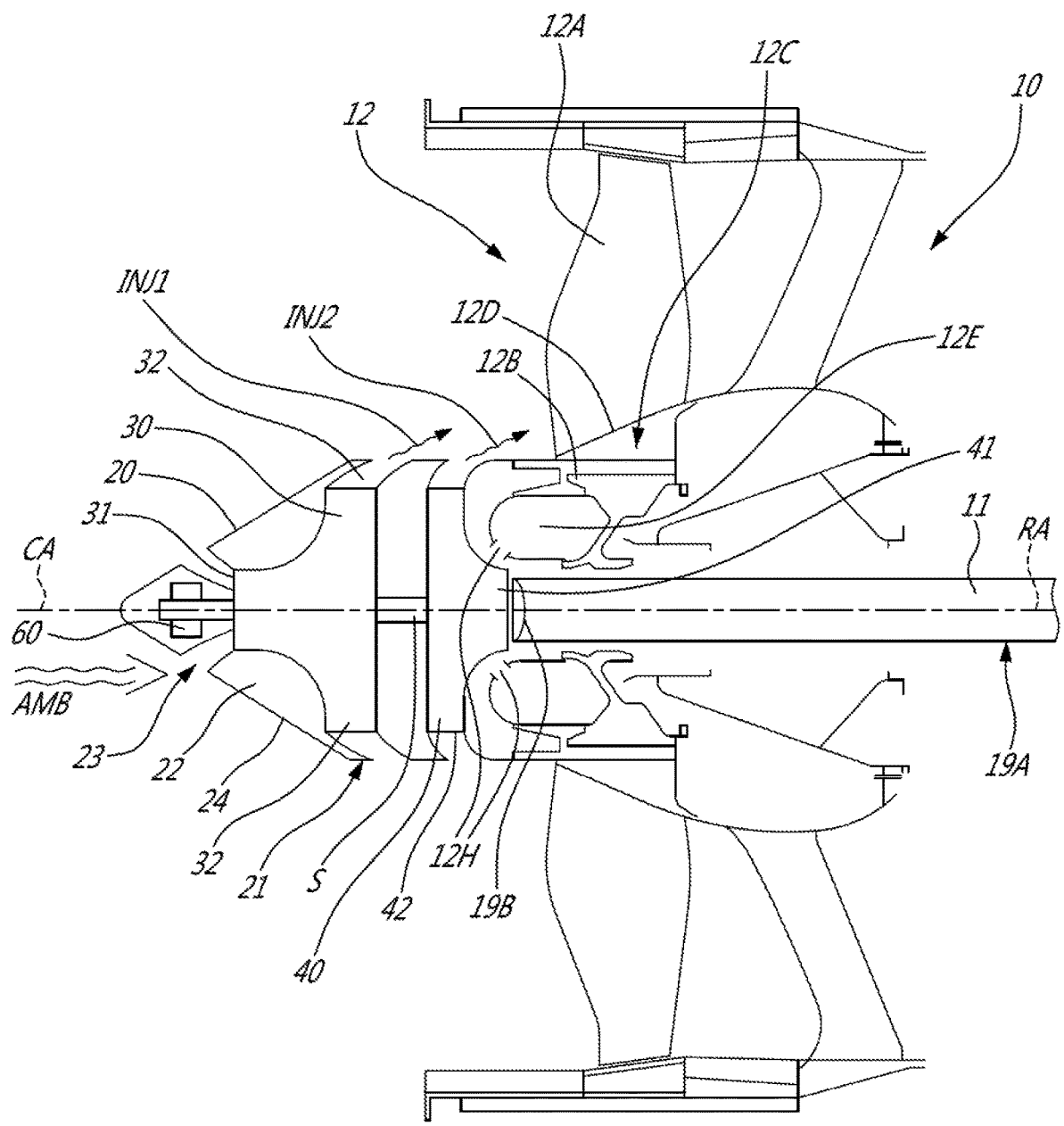
FIG. 2 is a partial cross-section view of a schematic representation of an exemplary nose cone with impellers such as used in the engine of FIG. 1.

FIG. 2 shows a partial cross-section view of a schematic representation of components of the gas turbine engine 10 of FIG. 1. In the depicted embodiment, the gas turbine engine 10 has an engine shaft 11 extending along the rotation axis RA. The engine shaft 11 may be a low-pressure shaft part of the compressor section 14, for instance. The engine shaft 11 is hollowed and defines a bore extending axially therethrough. Having such hollowed engine shaft 11 allows hot gas to flow therein between a hot gas inlet 19A located within the gas turbine engine 10, for instance downstream the compressor section 14, relative to a direction of airflow through the engine in use, and a hot gas outlet 19B located upstream thereof.

The fan 12 is driven by the engine shaft 11 for rotation therewith about the rotation axis RA. The fan 12 comprises a plurality of circumferentially distributed fan blades 12A extending from a hub 12B. The fan 12 may be disposed at or near an inlet of the gas turbine engine 10 and may be considered an inlet fan. The fan 12 may be considered as part of the compressor section 14. The fan blades 12A may be arranged as a circular array of radially extending fan blades 12A secured to the hub 12B. In some embodiments, the fan blades 12A may be integrally formed with the hub 12B as a unitary construction, or, the fan blades 12A may comprise separately-formed components secured to the hub 12B according to any suitable method. Each fan blade 12A may have a root region 12C located at or near an outer surface 12D of the hub 12B. A root region 12C may be considered a radially-inner portion of a fan blade 12A.

The hub 12B may be drivingly coupled to the engine shaft 11, directly or indirectly, for common rotation therewith. Alternatively, the hub 12B may be drivingly coupled to the engine shaft 11 via a suitable (e.g., speed-reducing) gear box. The hub 12B may be drivingly coupled to the engine shaft 11 according to any suitable method for rotation about rotation axis RA.

In the depicted embodiment, the hub 12B defines a cavity 12E radially inward of the fan blades 12A. A wall of the cavity 12E may correspond to the outer surface 12D of the hub 12B, in some embodiments. In the depicted embodiment, the cavity 12E is not sealed and there may have one or more gas passage 12H, which will be referred to later as gas by-pass passage 12H. In some embodiments, although not shown, the hub 12B may define one or more injection passages for directing injection air to root region 12C of one or more of fan blades 12A, for instance as described in U.S. Patent Publication 2018/0030893, the entire contents of which being incorporated herein by reference.

The fan blades 12A and the hub 12B may define a flow passage extending through the fan 12 and through which the ambient air AMB is propelled toward a core of the gas turbine engine 10 and/or toward a bypass duct of the gas turbine engine 10. The flow passage through the fan 12 may be considered part of the gas path of the gas turbine engine 10. The flow passage may comprise one or more spaces defined between two adjacent fan blades 12A and extending radially from the hub 12B to the tips of the adjacent fan blades 12A. The flow passage may extend axially from a leading edge of one or more of the fan blades 12A to a trailing edge of the one or more fan blades 12A. In some embodiments, the flow passage may extend axially from a forward end of the hub 12B to an aft end of the hub 12B along the axis of rotation RA. A radially-inner portion of the flow passage (i.e., at or near the hub 12B) may also be known as an "inner core" region of the fan 12.

With continued reference to FIG. 2, the nose cone 20 is mounted to the fan 12, i.e. upstream of the hub 12B, and coaxial therewith. The nose cone 20 projects axially beyond the fan blades 12A. In other words, the nose cone 20 extends axially upstream of the fan blades 12A. In some embodiments, the nose cone 20 may be secured to hub 12B for common rotation therewith. The nose cone 20 may also be referred to as "inlet cone" or "fan spinner" of the gas turbine engine 10. The nose cone 20 may be integrally formed with the hub 12B as a unitary construction, or the nose cone 20 may comprise a separately formed component or components (e.g., removably) secured individually or as an assembly to the hub 12B according to any suitable method such as by a plurality of circumferentially-distributed fasteners (not shown).

The nose cone 20 has a conical body including an outer wall 21 defining an outer surface 24 of the nose cone 20 for interfacing with a free stream of ambient air AMB (e.g., ram air) entering the gas turbine engine 10 during flight or other mode(s) of operation of the gas turbine engine 10. In some embodiments, the outer surface 24 of the outer wall 21 of the nose cone 20 may be substantially flush with the outer surface 12D of the hub 12B and may serve to direct the ambient air AMB into the inner core region of the fan 12.

Figure 3:
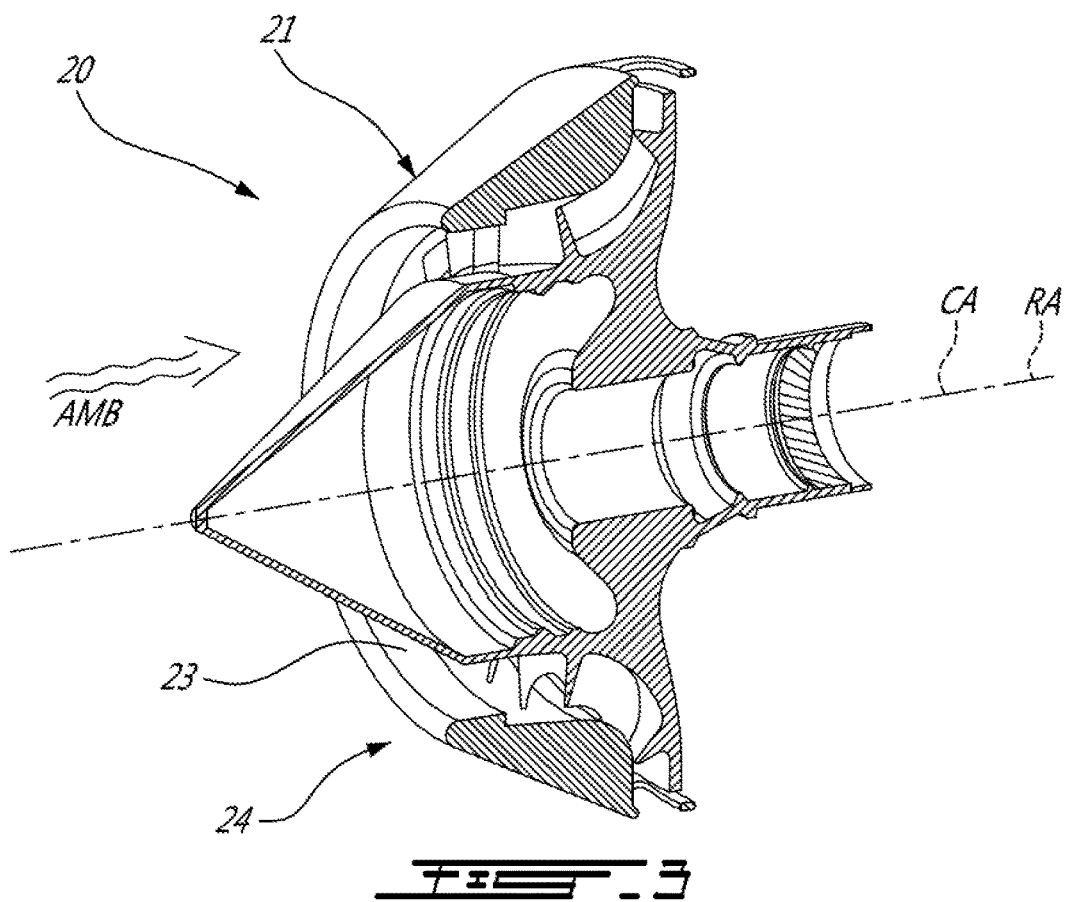
FIG. 3 is a cross-section of a perspective view of an example of the nose cone of FIG. 2.
Figure 4:
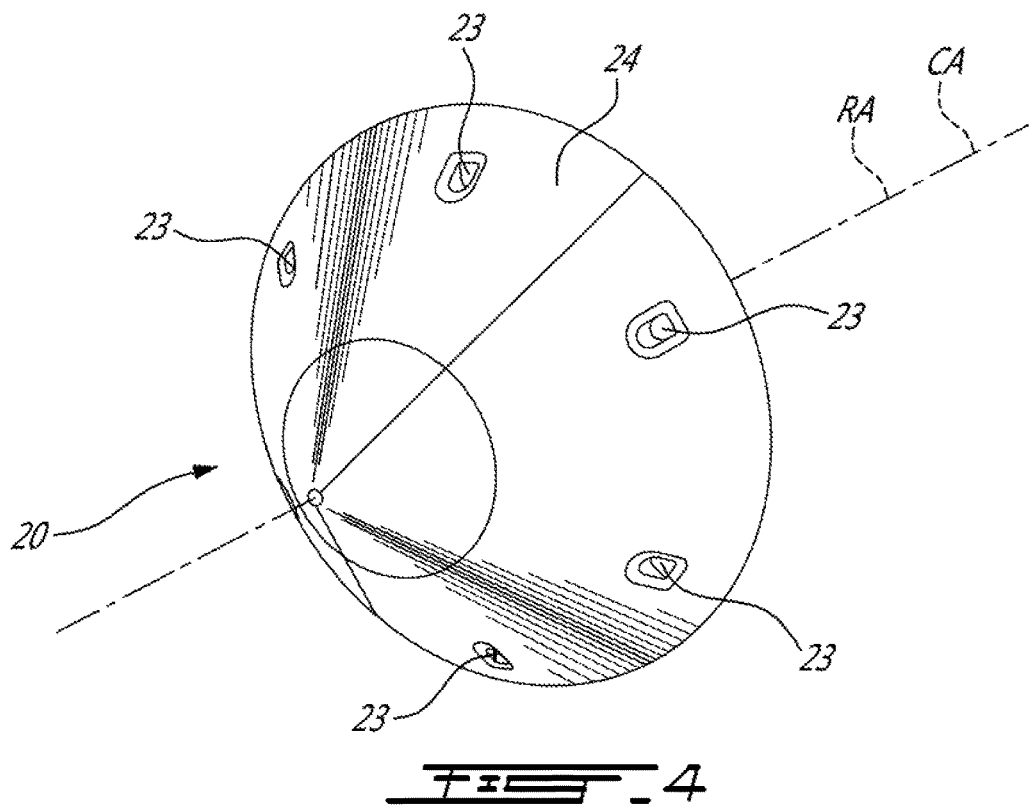
FIG. 4 is a cross-section of a perspective view of another example of the nose cone of FIG. 2.

The nose cone 20 defines an interior 22 (i.e., an internal volume/space), which may also be referred to as a nose cone cavity, at least partially enclosed by the outer wall 21. The interior 22 of the nose cone 20 is in fluid flow communication with ambient air AMB and with a hot gas passage defined through the engine shaft 11, as will be described later. The nose cone 20 has an air inlet 23 defined in its outer surface 24. The air inlet 23 is opened in a forward direction of the gas turbine engine 10. In other words, the air inlet 23 faces forward of the gas turbine engine 10 and is oriented such that ambient air AMB coming from upstream of the gas turbine engine 10 may be ingested in the interior 22 of the nose cone 20. In an embodiment, such as shown in FIG. 3, the air inlet 23 is an annular opening coaxial with rotation axis RA of the gas turbine engine 10. In an alternate embodiment, such as shown in FIG. 4, the air inlet 23 includes a plurality of discrete inlets defined in the outer surface 24 and disposed circumferentially about the rotation axis RA, which may correspond to the central axis CA of the nose cone 20. Other configurations of air inlet 23 may be contemplated in other embodiments.

Returning to FIG. 2, the nose cone 20 houses (houses at least partially) a dual impeller system, which includes a first and a second impeller. The impellers within the nose cone may produce a high velocity, low pressure, vortex of air that may be directed against the fan blades 12A at their roots 12C. This may cause particles (including ice particles, sand, dirt, etc.) to be repelled radially outwardly, away from the core of the gas turbine engine 10, as mentioned previously. Because of the air exiting the impeller(s) is hot, for instance heated due to mechanical work of the impeller(s) on the gas flowing therethrough or due to their origin within the engine 10, the impeller(s) may contribute to de-icing and/or preventing accumulation of ice on the fan blades 12A and/or part of the hub 12B and/or part of the nose cone 20.

For simplicity, the first impeller mentioned above may be referred to as a forward facing impeller 30 and the second impeller may be referred to as a rearward facing impeller 40, with such designations referring to their respective orientation within the nose cone 20 and relative to the general orientation of the gas turbine engine 10 along rotation axis RA. The forward facing impeller 30 and the rearward facing impeller 40 are housed (housed, disposed, at least partially) in the interior 22 of the nose cone 20. The forward facing impeller 30 is configured to ingest ambient air AMB coming from upstream of the gas turbine engine 10 and to compress such ambient air AMB for injection of at least part it to the inner core region of the fan 12. In other words, the forward facing impeller 30 may add energy to the ambient air AMB ingested in the nose cone 20 in order to increase pressure of the ambient air AMB and produce one or more flows of injection air INJ1 at the outlet 32 of the forward facing impeller 30. More particularly, in the depicted embodiment, at least part of the ambient air AMB exiting from the forward facing impeller 30 is injected upstream of the fan blades 12A, at root regions 12C thereof. All of the ambient air AMB exiting from the forward facing impeller 30 may be injected upstream of the fan blades 12A, at root regions 12C thereof in some cases, which may maximize de-icing. The pressurization of ambient air AMB may cause an increase in temperature of the pressurized injection air INJ1. As such, the flow of pressurized air may cause some heat to be transferred to the outer wall 21 and provide some anti-icing protection for the outer wall 21 of the nose cone 20, depending on the amount of heat transferred thereto and associated temperatures. The injection air INJ1 exiting the outlet 32 of the forward facing impeller 30 may be hotter than at the air inlet 23 and may contribute to de-icing and/or limiting formation of ice on the fan blades 12A targeted with such injection air INJ1.

Impellers may be operated as centrifugal compressors or as turbines as described later. Impellers may receive air coming in an axial direction and discharge such air in a direction transverse to said axial direction.

The forward facing impeller 30 has an inlet 31 that faces a forward direction of the gas turbine engine 10. In other words, the inlet 31 is oriented toward the tip of the nose cone 20, with the inducer and exducer of the forward facing impeller 30 facing the tip of nose cone 20 and/or the free stream of ambient air AMB coming fore of the gas turbine engine 10 during normal forward movement of the gas turbine engine 10, such as in use with an aircraft. The inlet 31 is in fluid flow communication with the air inlet 23 defined in the outer surface 24 of the nose cone 20 to receive ambient air AMB therefrom. The inlet 31 and the outlet 32 are in fluid flow communication as air flowing through the impeller enters at the inlet 31 and exits at the outlet 32 while being compressed. As shown in FIG. 2, the inlet 31 is closer from the tip of the nose cone 20 than the outlet 32, when viewed along the central axis CA of the nose cone 20.

In the depicted embodiment, the rearward facing impeller 40 is coaxial with the forward facing impeller 30. The rearward facing impeller 40 has an inlet 41 that faces a rearward direction of the gas turbine engine 10. In other words, the inlet 41 faces away from the tip of the nose cone 20, or opposite the tip of the nose cone 20. Stated differently, the inlet 31 of the forward facing impeller 30 and the inlet 41 of the rearward facing impeller 40 face opposite directions. The inlet 41 is in fluid flow communication with the hot gas outlet 19B (earlier described), with such hot gas outlet 19B being defined where the nose cone 20 and a forward end of the engine shaft 11 merge or interface with one another.

The inlet 41 is in fluid flow communication with the outlet 42 of the rearward facing impeller 40. At least part of the hot gas entering the inlet 41 of the rearward facing impeller 40 exits via the outlet 42. Similar to the forward facing impeller 30, in some embodiments the rearward facing impeller 40 may add energy to hot gas entering the inlet 41 in order to increase velocity (if operated as a turbine, for instance) of the hot gas for then discharging at least part of such "energized" hot gas INJ2 upstream of the fan blades 12A, which may be at root regions 12C thereof. This source of energized hot gas INJ2 may contribute to de-icing and/or limit formation of ice on the fan blades 12A, similar to what was discussed above with respect to injection air INJ1 flowing out from forward facing impeller 30. With the dual impeller system described above, both the injection air INJ1 and the energized hot gas INJ2 discharged from the interior 22 of the nose cone 20 may work together and, in some embodiments, improve de-icing or anti-icing efficiency over other types of de-icing systems, and/or serve as a suitable repellent for particles that may otherwise be ingested by the core of the gas turbine engine 10 (as earlier mentioned).

In some embodiments, the forward facing impeller 30 and the rearward facing impeller 40 may share a same back plate. For instance, the forward facing impeller 30 and the rearward facing impeller 40 may be integral with one another in some cases, though they may be separate parts in other cases.

The forward facing impeller 30 and the rearward facing impeller 40 may or may not be drivingly engaged to one another, depending on the embodiments. For instance, in an embodiment, at least one of the forward facing impeller 30 and the rearward facing impeller 40 includes an impeller shaft S, on which both the forward facing impeller 30 and the rearward facing impeller 40 may be mounted.

In embodiments where impeller shaft S is present, bearings 60 may be mounted at an outer periphery of impeller shaft S, although bearings 60 may be mounted inside impeller shaft S, depending on the configuration of impeller shaft S. For instance, impeller shaft S may be an annular shaft, with bearings 60 mounted in the shaft, for instance.

In an embodiment, at least one of the forward facing impeller 30 and the rearward facing impeller 40 is drivingly decoupled from the nose cone 20 and/or the engine shaft 11 and supported radially within the interior 22 (or simply "nose cone cavity") of the nose cone 20 via bearings 60 (e.g. ceramic bearings, or other suitable types of bearings). As such, the forward facing impeller 30 and/or the rearward facing impeller 40 may be driven at a different rotational speed than the nose cone 20 and/or the engine shaft 11, allowing independent rotation from the nose cone 20 and/or from the engine shaft 11, all this without any gearbox, which would increase weight unnecessarily. Embodiments where the forward facing impeller 30 and/or the rearward facing impeller 40 is/are drivingly decoupled from the nose cone 20 and/or the engine shaft 11 may be referred to as a turbocompressor configuration.

In embodiments where both the forward facing impeller 30 and the rearward facing impeller 40 are drivingly coupled together and decoupled from the nose cone 20 and the engine shaft 11, the rearward facing impeller 40 may work as a turbine, as it may expand (and increase velocity of) the hot gas received from downstream of the compressor section 14. This may cool down such hot gas, which is then discharged as energized hot gas INJ2 (discussed above). The hot gas so-expanded may produce mechanical work manifested as positive torque imparted to the rearward facing impeller 40 (as a result of the hot gas flowing through the blades). The positive torque may then be transferred to the forward facing impeller 30 via shaft S. The forward facing impeller 30 may thus work as a compressor, whereby ambient air AMB may be ingested (or "sucked in") from upstream of the nose cone 20 as a result of the forward facing impeller 30 in rotation. As such, the so-ingested ambient air AMB may be compressed and heated up before being discharged as injection air INJ1 (discussed above) upstream of the fan blades 12A.

Figure 5:
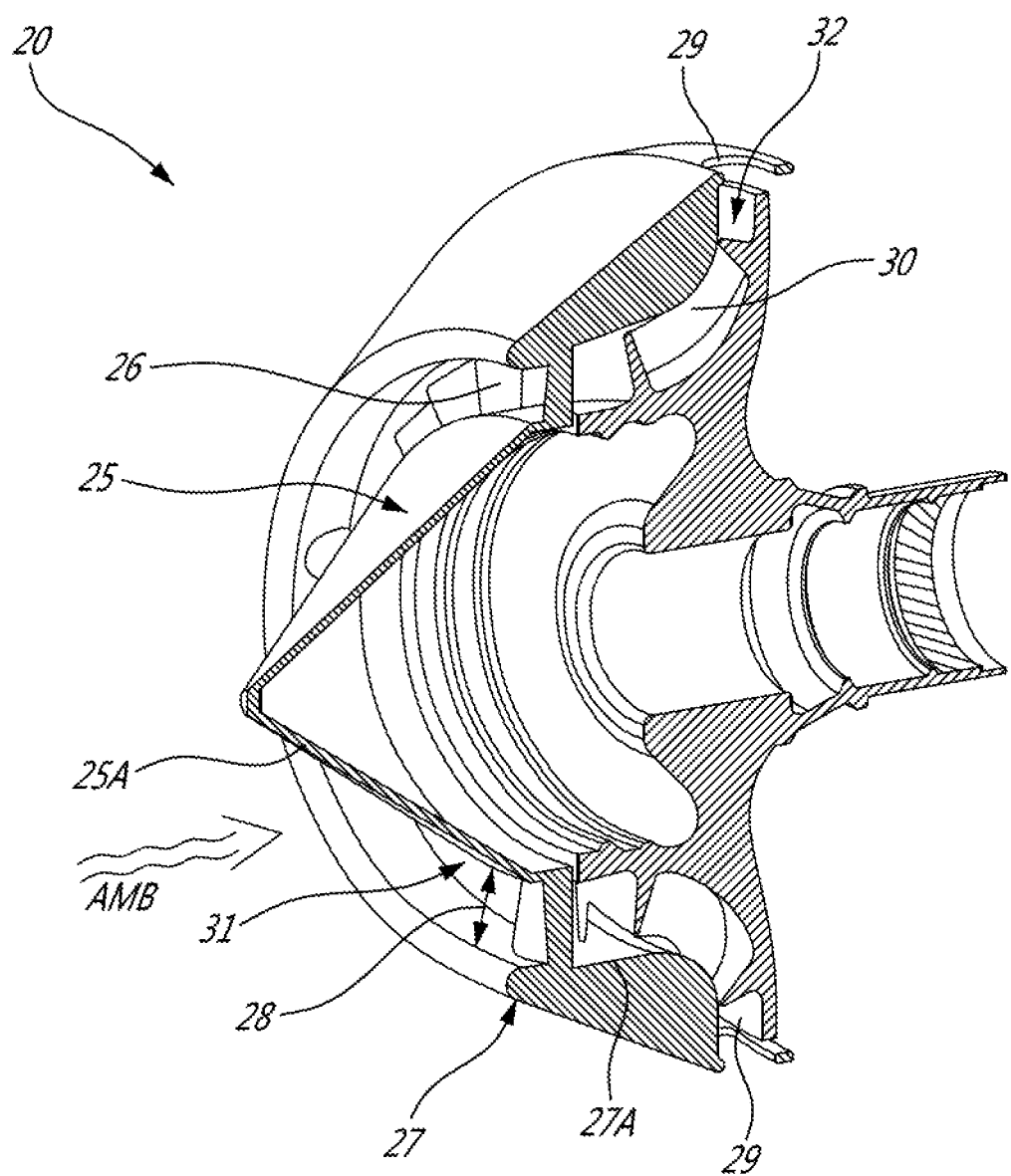
FIG. 5 is a cross-section of a perspective view of another example of the nose cone of FIG. 2.

In a particular embodiment, the forward facing impeller 30 may be coupled to the nose cone 20 and/or be integral therewith. This is shown in the embodiment of FIG. 5, for instance. More particularly, in the depicted embodiment, the nose cone 20 includes a central portion 25 including a conical shell 25A defining a tip of the nose cone 20 at the foremost portion thereof, with the central portion 25 defining an array of impeller blades 26 distributed circumferentially about the central portion 25 of the nose cone 20 aft the conical shell 25A, and a shroud portion 27 defining an annular body 27A overlaying circumferentially the array of impeller blades 26 so as to form a shroud of the forward facing impeller 30. An annular radial gap 28 extending between the central portion 25 and the shroud portion 27 defines an annular opening by which ambient air AMB may enter the inlet 31 of the forward facing impeller 30. Ambient air AMB ingested through this annular radial gap 28 may flow through the forward facing impeller 30 and exit the forward facing impeller 30 at its outlet 32. In the depicted embodiment, ambient air AMB discharged from the outlet 32 goes through a plurality of circumferentially elongated slots 29 distributed along the circumference of the shroud portion 27, with the slots 29 axially aligned with the outlet 32.

In an embodiment, part of the hot gas entering the inlet 41 of the rearward facing impeller 40 may be directed inside the cavity 12E of the hub 12B. A portion of hot gas entering the inlet 41 may not exit the rearward facing impeller 40 via the outlet 42, but rather via one or more gas by-pass passage 12H defined in the fan hub cavity wall 12G, in a region downstream of the inlet 41 and upstream of the outlet 42. Such hot gas directed in the cavity 12E may serve to de-ice the hub 12B, for instance, as heat from the hot gas may be transferred via convection within the cavity 12E. In an embodiment, a fraction of the hot gas flowing through the inlet 41 is bled off the rearward facing impeller 40 via the one or more gas by-pass passage 12H to reach the fan hub cavity 12E, with such fraction being less than ½ of a total volume of hot gas flowing through the inlet 41, in a particular embodiment. In other words, a majority of the hot gas flowing through the inlet 41 exits via outlet 42, with less hot gas flowing via the one or more gas by-pass passage 12H, in most embodiments. Other proportions or fractions may be contemplated in other embodiments.

Referring to FIG. 6, in some embodiments, the engine shaft 11 may include a pre-swirler 70 disposed therein. An embodiment of the pre-swirler 70 may define a plurality of vanes 71 to impart rotation to a volume of hot gas before the volume of hot gas coming from inside the engine shaft 11 (between hot gas inlet 19A and hot gas outlet 19B) towards the inlet 41 of the rearward facing impeller 40 enters the inlet 41. The addition of such pre-swirler 70 may impart a swirl component to the hot gas flow vector entering inlet 41, where the angular momentum of the hot gas interacting with the impeller blades in the inducer region of the impeller 40 may impart more spin to the "freewheeling" impeller.

Methods of de-icing fan blades 12A of a gas turbine engine 10 may flow from the dual-impeller systems for which some embodiments are described above.

A method includes receiving ambient air AMB from upstream of the gas turbine engine 10 into a forward facing impeller 30 disposed in the nose cone 20 via the air inlet 23 defined in the nose cone 20 and in fluid flow communication with the forward facing impeller 30; receiving hot gas from the compressor section 14 of the gas turbine engine 10 into a rearward facing impeller 40 disposed in the nose cone 20 via a gas passage inside of the engine shaft 11 in fluid flow communication with the rearward facing impeller 40; expanding the hot gas via the rearward facing impeller 40 and compressing the ambient air AMB via the forward facing impeller 30; and discharging at least part of the ambient air AMB exiting from the forward facing impeller 30 and the hot gas exiting from the rearward facing impeller 40 upstream of the fan blades.

In an embodiment, the method includes bleeding off a fraction of the hot gas flowing through the inlet 41 of the rearward facing impeller 40 via one or more hot gas by-pass passage 12H defined in a fan hub cavity wall 12G in a region downstream the inlet 41 and upstream an outlet 42 of the rearward facing impeller 40, the hot gas by-pass passage 12H being in fluid flow communication with a fan hub cavity 12E radially inward of the fan blades 12A, and heating the fan hub cavity 12E with the hot gas ingested therein via the hot gas by-pass passage 12H.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A gas turbine engine, comprising:
a compressor section including a fan having a plurality of fan blades, the fan driven by an engine shaft about a rotation axis, the engine shaft defining a bore extending axially therethrough from a hot gas inlet to a hot gas outlet, the hot gas inlet located downstream of the compressor section relative to a direction of airflow through the engine in use;
a nose cone mounted to the fan and extending upstream of the fan blades, the nose cone defining a cavity therewithin;
a first impeller mounted within the cavity of the nose cone, the first impeller having an inlet facing a forward direction of the gas turbine engine, the inlet of the first impeller in fluid flow communication with an air inlet defined in an outer surface of the nose cone to receive ambient air;
a second impeller mounted within the cavity of the nose cone, the second impeller having an inlet facing a rearward direction of the gas turbine engine, the inlet of the second impeller being in fluid flow communication with the hot gas outlet of the engine shaft; and
wherein one of the engine shaft and a shaft mating portion of the nose cone includes a pre-swirler disposed therein, the pre-swirler defining a plurality of vanes to impart rotation to a volume of hot gas before the volume of hot gas coming from inside the engine shaft towards the inlet of the second impeller enters the inlet of the second impeller.

2. The gas turbine engine as defined in claim 1, wherein at least one of the first impeller and the second impeller is drivingly decoupled from the nose cone and supported radially within the cavity via bearings.

3. The gas turbine engine as defined in claim 2, wherein both the first and second impellers are drivingly decoupled from the engine shaft and the nose cone, the first and the second impellers being supported radially within the cavity via the bearings.

4. The gas turbine engine as defined in claim 2, wherein one of the first and the second impellers includes an impeller shaft, the bearings being mounted at an outer periphery of the impeller shaft.

5. The gas turbine engine as defined in claim 1, wherein the first and the second impellers are drivingly engaged to one another.

6. The gas turbine engine as defined in claim 2, wherein one of the first and the second impellers includes an annular impeller shaft, the bearings being mounted inside the annular impeller shaft.

7. The gas turbine engine as defined in claim 1, further comprising a fan hub cavity radially inward from the fan blades, said fan hub cavity having a hot gas inlet defined downstream of the inlet of the second impeller and in fluid flow communication therewith, and a hot gas outlet defined upstream of the fan blades adjacent roots thereof, the hot gas inlet and the hot gas outlet being in fluid flow communication to eject hot gas entering the hot gas inlet via the hot gas outlet upstream of the fan blades.

8. The gas turbine engine as defined in claim 1, wherein the air inlet defined in the outer surface of the nose cone is an annular opening coaxial with a central axis of the gas turbine engine.

9. The gas turbine engine as defined in claim 1, wherein the nose cone defines a plurality of inlets in the outer surface, the plurality of inlets disposed circumferentially about a central axis of the nose cone.

10. The gas turbine engine as defined in claim 1, wherein the first impeller is made integral with the nose cone.

11. A nose cone for a gas turbine engine, the nose cone having a conical body defining a tip of the nose cone, the nose cone comprising:
an air inlet defined in the conical body to receive ambient air;
a forward facing impeller mounted within the nose cone, the forward facing impeller having an inlet and an outlet in fluid flow communication, the inlet closer from the tip than the outlet, the inlet in fluid flow communication with the air inlet and the outlet in fluid flow communication with an air outlet defined in the conical body further from the tip of the nose cone than the air inlet; and
a rearward facing impeller mounted within the nose cone, the rearward facing impeller coaxial with the forward facing impeller, the rearward facing impeller having an inlet facing opposite the tip of the nose cone.

12. The nose cone as defined in claim 11, wherein at least one of the rearward facing impeller and the forward facing impeller is drivingly decoupled from the nose cone and supported radially within the nose cone via bearings.

13. The nose cone as defined in claim 11, wherein the air inlet defined in the conical body of the nose cone is an annular opening coaxial with a central axis of the nose cone.

14. The nose cone as defined in claim 11, wherein the nose cone defines a plurality of air inlets in the conical body of the nose cone, the plurality of air inlets disposed circumferentially about a central axis of the nose cone.

15. The nose cone as defined in claim 11, wherein the forward facing impeller is made integral with the nose cone and the rearward facing impeller is drivingly decoupled from the nose cone.

16. The nose cone as defined in claim 11, wherein the forward and rearward facing impellers are drivingly engaged to one another via a common shaft.

17. The nose cone as defined in claim 12, wherein the forward and rearward facing impellers are drivingly engaged to one another via a common shaft, the common shaft interfacing with the bearings, such that both the forward facing and rearward facing impellers are drivingly decoupled from the nose cone.

18. A method of de-icing fan blades of a gas turbine engine, the gas turbine engine including a nose cone and an engine shaft, the method comprising:
receiving ambient air from upstream of the gas turbine engine into a forward facing impeller disposed in the nose cone via an air inlet defined in the nose cone and in fluid flow communication with the forward facing impeller;
receiving hot gas from a compressor section of the gas turbine engine into a rearward facing impeller disposed in the nose cone via a gas passage inside of the engine shaft in fluid flow communication with the rearward facing impeller;
expanding the hot gas via the rearward facing impeller and compressing the ambient air via the forward facing impeller; and
discharging at least part of the ambient air exiting from the forward facing impeller and the hot gas exiting from the rearward facing impeller upstream of the fan blades.

19. The method as defined in claim 18, further comprising:
bleeding off a fraction of the hot gas flowing through an inlet of the rearward facing impeller via a hot gas by-pass passage defined in a fan hub cavity wall in a region downstream the inlet and upstream an outlet of the rearward facing impeller, the hot gas by-pass passage being in fluid flow communication with a fan hub cavity radially inward of the fan blades; and
heating the fan hub cavity with the hot gas ingested therein via the hot gas by-pass passage.

* * * * *